United States Patent
Tesla

(10) Patent No.: US 12,297,717 B1
(45) Date of Patent: May 13, 2025

(54) SYSTEMS AND METHODS FOR TEMPERATURE TRACKING AND DETECTION OF LEAKS

(71) Applicant: Tesla Subsea Inc., Katy, TX (US)

(72) Inventor: Marlon J. Tesla, Katy, TX (US)

(73) Assignee: Tesla Subsea Inc., Katy, TX (US)

( * ) Notice: Subject to any disclaimer, the term of this patent is extended or adjusted under 35 U.S.C. 154(b) by 0 days.

(21) Appl. No.: 18/765,137

(22) Filed: Jul. 5, 2024

(51) Int. Cl.
- *E21B 41/00* (2006.01)
- *F17D 5/06* (2006.01)
- *G01M 3/00* (2006.01)

(52) U.S. Cl.
CPC ............ *E21B 41/0007* (2013.01); *F17D 5/06* (2013.01); *G01M 3/002* (2013.01)

(58) Field of Classification Search
CPC ....... E21B 41/0007; F17D 5/06; G01M 3/002
See application file for complete search history.

(56) References Cited

U.S. PATENT DOCUMENTS

| | | | | |
|---|---|---|---|---|
| 5,883,815 | A * | 3/1999 | Drakulich | G01M 3/002 73/40 |
| 7,100,994 | B2 * | 9/2006 | Vinegar | C10G 45/00 423/208 |
| 10,656,041 | B2 * | 5/2020 | Hadley | G01M 3/002 |
| 11,536,132 | B2 * | 12/2022 | Xia | E21B 47/12 |
| 2002/0027001 | A1 * | 3/2002 | Wellington | E21B 36/04 166/59 |
| 2003/0085034 | A1 * | 5/2003 | Wellington | E21B 36/001 166/248 |
| 2006/0220888 | A1 * | 10/2006 | Germouni | G08B 21/14 165/11.1 |
| 2016/0290890 | A1 * | 10/2016 | Daussin | G01M 3/38 |
| 2016/0298447 | A1 * | 10/2016 | Mohaghegh | E21B 47/10 |
| 2016/0341844 | A1 * | 11/2016 | McStay | G01V 3/15 |
| 2017/0059441 | A1 * | 3/2017 | Latini | F16L 23/003 |
| 2017/0276894 | A1 * | 9/2017 | Green | G01M 3/047 |
| 2017/0350234 | A1 * | 12/2017 | Xia | E21B 47/10 |
| 2019/0106984 | A1 * | 4/2019 | Lee | E21B 47/11 |
| 2020/0340879 | A1 * | 10/2020 | McAuley | E21B 33/06 |
| 2021/0048364 | A1 * | 2/2021 | Yin | E03B 7/071 |
| 2024/0003771 | A1 * | 1/2024 | Langdale | G06T 7/136 |
| 2024/0280431 | A1 * | 8/2024 | Zeng | G01M 3/002 |

\* cited by examiner

*Primary Examiner* — Nathaniel T Woodward
*Assistant Examiner* — Philip L Cotey
(74) *Attorney, Agent, or Firm* — Holland & Hart LLP

(57) ABSTRACT

A method of detecting a leak in a production, drilling, or export system including a control system including at least one temperature transmitter. The method includes detecting the operating temperature of production fluid. The method also includes activating a temperature tracking system if the operating temperature of the production fluid exceeds a minimum temperature threshold. The method further includes determining if the operating temperature has reached a steady state operating temperature for a predetermined stability period. The method also includes arming the temperature tracking system by determining a temperature zone that extends above and below the steady state operating temperature of the production fluid. The method further includes continuously determining if the operating temperature is within the temperature zone. The method also includes indicating to an operator a potential of a leak in the production, drilling, or export system if the operating temperature deviates from the temperature zone.

20 Claims, 5 Drawing Sheets

SYSTEMS AND METHODS FOR TEMPERATURE TRACKING AND DETECTION OF LEAKS

TECHNICAL FIELD

The invention relates generally to systems and methods for leak detection and monitoring in subsea systems.

Background of Certain Aspects of the Disclosure

Subsea oil and gas production generally involves drilling and operating wells to locate and retrieve hydrocarbons. Subsea well sites are positioned in relatively deep water and produce oil and gas which is channeled to surface facilities for further processing in production risers, subsea pipelines, jumpers, manifolds, and/or trees. Subsea oil and gas production systems typically include a plurality of wells that are connected to at least one production riser or land-based landing by a plurality of subsea pipelines. The subsea pipeline may be flexible or rigid and transports produced oil, gas, water, and/or other production fluids to the production riser or land-based gathering terminal. The production riser may also be flexible or rigid and transports produced oil, gas, water, and/or other production fluids to a production facility.

The production riser may be substantially vertical or may have a variety of wave forms. However, the production riser will typically have substantially vertical portions regardless of the configuration of the production riser. Slug flow in the flowline or base of the production riser is a condition characterized by the flow of an intermittent sequence of liquid slugs followed by longer gas bubbles flowing through the production riser. This flow pattern is frequently encountered in oil/gas production and transport lines because of liquid accumulation due to instantaneous imbalances between pressure and gravitational forces caused by production riser and subsea pipeline undulations and natural growth of hydrodynamic instabilities. Slug flow in production risers and subsea pipelines can cause large pressure changes in the production risers and subsea pipelines.

At least one known method of detecting leaks in subsea systems includes the Conditional Rate of Change (CROC) method. Though CROC systems have shown a potential to be detect some leaks, CROC methodologies still have blind spots or shortcomings and require improvement or supplemental methods to provide more comprehensive coverage. Specifically, one of the main challenges affecting leak detection is the uniqueness of each subsea system. Operational decisions and flowing conditions can be dynamic, both day-to-day and over the life of the field. There may be fluctuations in the production's pressure, temperature, flow rate, composition, and fluid ratios. Over the life of a field, flowing pressure decreases and often reaches a point where it is very close to, or even below, subsea ambient pressure.

Typically, CROC detects leaks by monitoring pressure and detecting rapid changes in pressure that would occur in a leak scenario. Monitoring thresholds and settings are adjusted as required when flowing conditions change, but there are limits to reliable monitoring with CROC. The CROC algorithm is unsuitable for fields that flow near ambient operating conditions due to the potential for false alarms in the narrow pressure range available to identify potential leaks. CROC leak detection under these conditions is especially difficult if slug flow is occurring because rapid pressure changes due to slug flow are hard to distinguish from the pressure changes that occur because of a leak because both scenarios can result in a relatively rapid change in pressure towards ambient conditions. Additionally, for systems that operate very near ambient pressure, the change in pressure if a leak were to occur would not be as dramatic and, therefore, very difficult to distinguish from normal operations.

As a result, there is a need for a leak detection system that supplements current leak detection technologies.

BRIEF SUMMARY OF SOME ASPECTS OF THE DISCLOSURE

One aspect of the present disclosure relates to a method of detecting a leak in a production, drilling, or export system including a control system including at least one temperature transmitter configured to detect an operating temperature of the production, drilling, or export system. The method includes detecting the operating temperature of production fluid within the production, drilling, or export system using the at least one temperature transmitter. The method also includes activating a temperature tracking system if the operating temperature of the production fluid exceeds a minimum temperature threshold. The method further includes determining if the operating temperature has reached a steady state operating temperature for a predetermined stability period. The method also includes arming the temperature tracking system by determining a temperature zone that extends above and below the steady state operating temperature of the production fluid. The method further includes continuously determining if the operating temperature is within the temperature zone. The method also includes indicating to an operator a potential of a leak in the production, drilling, or export system if the operating temperature deviates from the temperature zone.

Another aspect of the present disclosure relates to a method of detecting a leak in a production, drilling, or export system including a control system including at least one temperature transmitter configured to detect an operating temperature of the production, drilling, or export system. The method includes detecting the operating temperature of production fluid within the production, drilling, or export system using the at least one temperature transmitter. The method also includes activating a temperature tracking system if the operating temperature of the production fluid exceeds a minimum temperature threshold. The method further includes determining if the operating temperature has reached a steady state operating temperature for a predetermined stability period. The method also includes automatically arming the temperature tracking system by determining a lower limit temperature below the steady state operating temperature of the production fluid lower limit temperature and an upper limit temperature above the steady state operating temperature of the production fluid lower limit temperature to define a temperature zone. The method further includes continuously determining if the operating temperature is within that temperature zone. The method also includes indicating to an operator a potential of a leak in the production, drilling, or export system if the operating temperature exceeds the upper temperature limit or is less than the lower temperature limit of the temperature zone.

Yet another aspect of the present disclosure relates to a method of detecting a leak in a production, drilling, or export system including a control system including at least one temperature transmitter configured to detect an operating temperature of the production, drilling, or export system. The method includes detecting the operating temperature of production fluid within the production, drilling, or export system using the at least one temperature transmitter. The method also includes activating a temperature tracking system if the operating temperature of the production fluid exceeds a minimum temperature threshold. The method further includes determining if the operating temperature has reached a steady state operating temperature for a predetermined stability period. The method also includes automatically arming the temperature tracking system by determining a lower limit temperature below the steady state operating temperature of the production fluid lower limit temperature and an upper limit temperature above the steady state operating temperature of the production fluid lower limit temperature. The method further includes continuously determining if the operating temperature is within the temperature zone. The method also includes initiating an alarm if the operating temperature exceeds the upper temperature limit or is less than the lower temperature limit.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

BRIEF DESCRIPTION OF THE DRAWINGS

A further understanding of the nature and advantages of the embodiments may be realized by reference to the following drawings. In the appended figures, similar components or features may have the same reference label.

Figure 1:
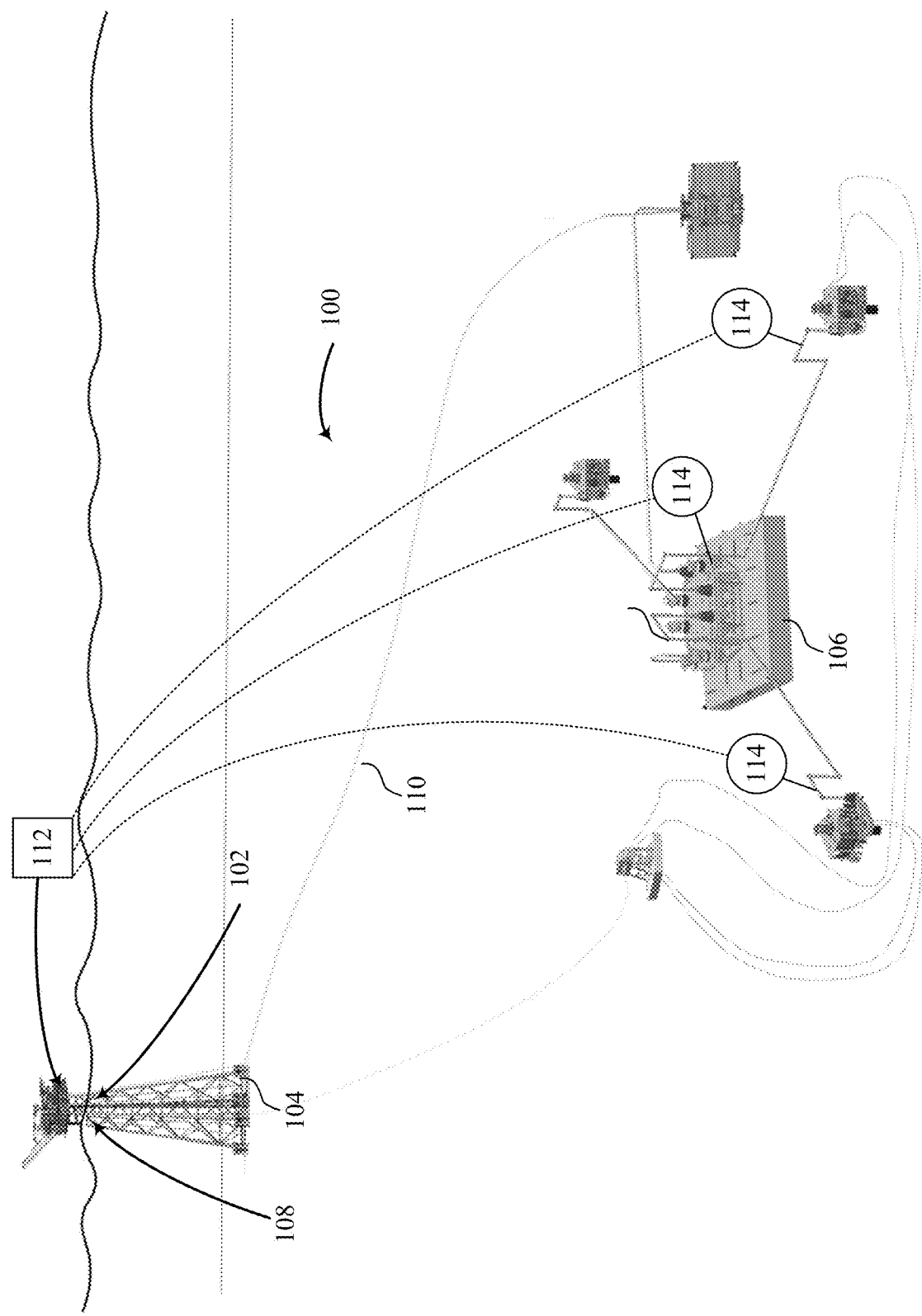
FIG. 1 is a block diagram of an exemplary subsea oil and gas production system in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods disclosed herein relate to, among other things, leak detection in oil and gas production systems. Specifically, the systems and methods described herein relate to a system and method for a temperature tracking system for leak detection in oil and gas production systems and/or for supplementing existing leak detection systems. Existing leak detections systems are unsuitable for fields that flow near ambient operating conditions due to the potential for false alarms in the narrow pressure range available to identify potential leaks. Existing leak detections systems may be unreliable if slug flow is occurring because rapid pressure changes due to slug flow are hard to distinguish from the pressure changes that occur due to a leak because both scenarios can result in a relatively rapid change in pressure towards ambient conditions.

The temperature tracking leak detection system described herein improves the accuracy of existing leak detection systems by monitoring the operating temperature within the production/drilling riser and/or the subsea pipeline, determining if the temperature has reached steady state flowing temperatures, establishing an upper and lower limit temperature value relative to the current operating temperature to define a temperature zone, determining if the operating temperature is between the upper and lower temperatures (operating temperature is greater than the lower limit temperature but less than the upper limit temperature), and alerting the operator to a possible leak if the operating temperature is not between the upper and lower limit temperatures.

If a leak were to occur in the production riser and/or the subsea pipeline, the production fluid is leaking out of the production/drilling riser and/or the subsea pipeline and the temperature of the production fluid in the production riser and/or the subsea pipeline typically increases or decreases depending on the operating conditions. Specifically, the ambient water temperature is typically below 42° F. and the temperature of the production fluid is typically above 100° F. During a leak, either the pressure of the production fluid is lower than the ambient pressure and cooler water enters the production riser and/or the subsea pipeline, decreasing the operating temperature of the production fluid, or the pressure of the production fluid is higher than the ambient pressure such that flow rate of the production fluid increases (into the environment and to the oil and gas production system), increasing the operating temperature of the production fluid. That is, during a leak, the typical temperature signatures of the production fluid within the system would significantly change, causing the temperature to increase or decrease in an unexpected manner. The systems and methods described herein detect whether the operating temperature is between the upper and lower limit temperatures and alerts the operator to a possible leak without relying on pressure spikes or changes. As such, the systems and methods described herein do not rely on changes in pressure and therefore reduce the scenarios where existing leak detection systems, such as CROC, are less likely to reliably detect a leak.

FIG. 1 is a schematic illustration of an exemplary oil and gas production system 100. In the illustrated embodiment, the production system 100 is illustrated as a subsea oil and gas production system. In alternative embodiments, the production system 100 may also include export systems in addition to the subsea oil and gas production system illustrated in FIG. 1. The production system 100 includes a surface facility 102 connected via at least one production riser 104 to at least one subsea production system 106, including a plurality of wells, on the seabed. In the illustrated embodiment, the surface facility 102 is a fixed platform production facility. In alternative embodiments, the surface facility 102 may be substituted for any other suitable vessel at the water surface or land-based facility. In the illustrated embodiment, the production system 100 includes a single surface facility 102, a production riser 104, and a single subsea production system 106. In alternative embodiments, the production system 100 may include any number of surface facilities 102, production risers 104, and subsea production systems 106 that enable the production system 10 to operate as described herein, including a plurality of surface facilities 102, a plurality of production risers 104, and a plurality of subsea production systems 106. The production riser 104 includes a first end 108 attached to the surface facility 102 and a second end 110 attached to the subsea production system 106. The production riser 104 is typically more than a kilometer long with a substantial vertical rise, and, as such, production fluids channeled through the production riser 104 may be in a slug flow regime due to instantaneous imbalances between pressure and gravitational forces caused by production riser and subsea pipeline undulations and natural growth of hydrodynamic instabilities.

The production system 100 produces oil and gas by extracting oil and gas at the seabed and transporting the production fluids to a processing facility. The processing facility may be the surface facility 102, another surface facility, and/or an on-shore processing facility. Typically, the surface facility 102 monitors and controls the production fluids. Specifically, in the illustrated embodiment, the surface facility 102 includes a control system 112 that monitors and controls the production fluids. In the illustrated embodiment, the control system 112 includes at least one temperature transmitter 116. The temperature transmitter 116 measures the temperature of the production fluid at the temperature transmitter.

In the illustrated embodiment, the control system 112 generally includes a Subsea Production Control System (SPCS) configured to control the flow of production fluids from wells located on the seabed. The SPCS manages the flow of the production fluids such that they can be transferred safely to the surface to be processed. An SPCS generally includes supply and control equipment located at the surface facility 102 and equipment on the seabed (subsea) that acts upon the commands of the surface facility 102. The control system 112 may include Integrated Control and Safety Systems (ICSS), Distributed Control Systems (DCS), Master Control Stations (MCS), Programmable Logic Controllers (PLC), and/or any other control system or device.

In the illustrated embodiment, the temperature transmitter 116 includes a temperature transmitter that is designed to withstand high pressures, corrosion, and water infiltration and may include thermocouples, thermistors, resistance temperature detectors, pyrometers, Langmuir probes, infrared thermometers, and/or any other temperature measuring device. Typically, the temperature transmitter 116 is most effective when it collects temperature data from a critical monitoring position subsea. As such, the temperature transmitter 116 may include Downstream Pressure and Temperature Transmitters, and/or Manifold/Pipeline End Manifold Pressure and Temperature Transmitters and may be positioned in a manifold directly downstream of a wellhead or in a production riser base. The temperature transmitter 116 is connected to the control system 112 by electric cables, wireless transmitters, and/or acoustic communications for instantaneous communication with the control system 112. The temperature transmitter 116 is configured to detect the operating temperature, or the temperature of the production fluid at the designated subsea leak detection sensor location and report the operating temperature to the control system 112.

Figure 2:
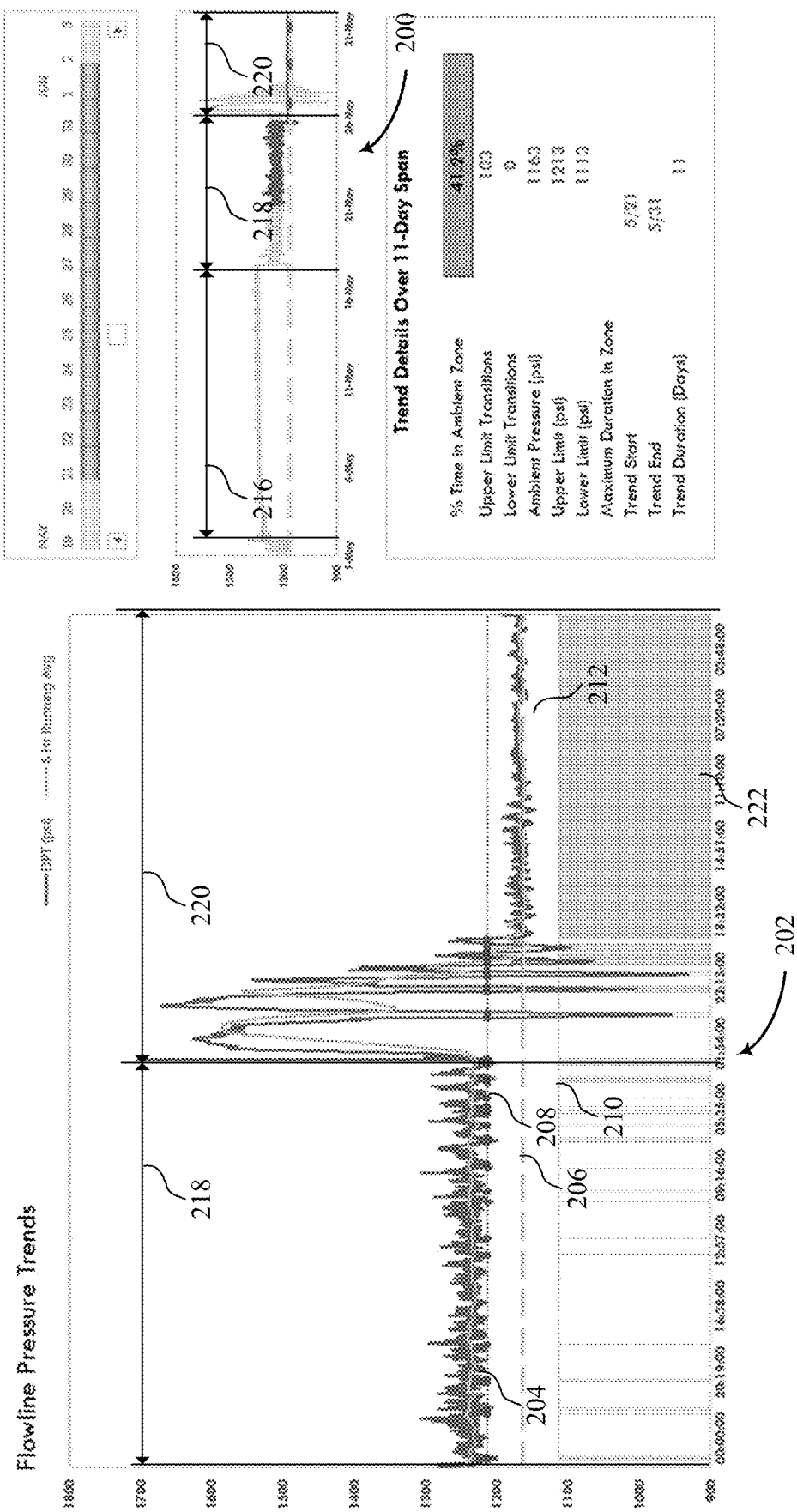
FIG. 2 illustrates an exemplary human machine interface display of the CTNA output in accordance with the aspects of the present disclosure.
Figure 3:
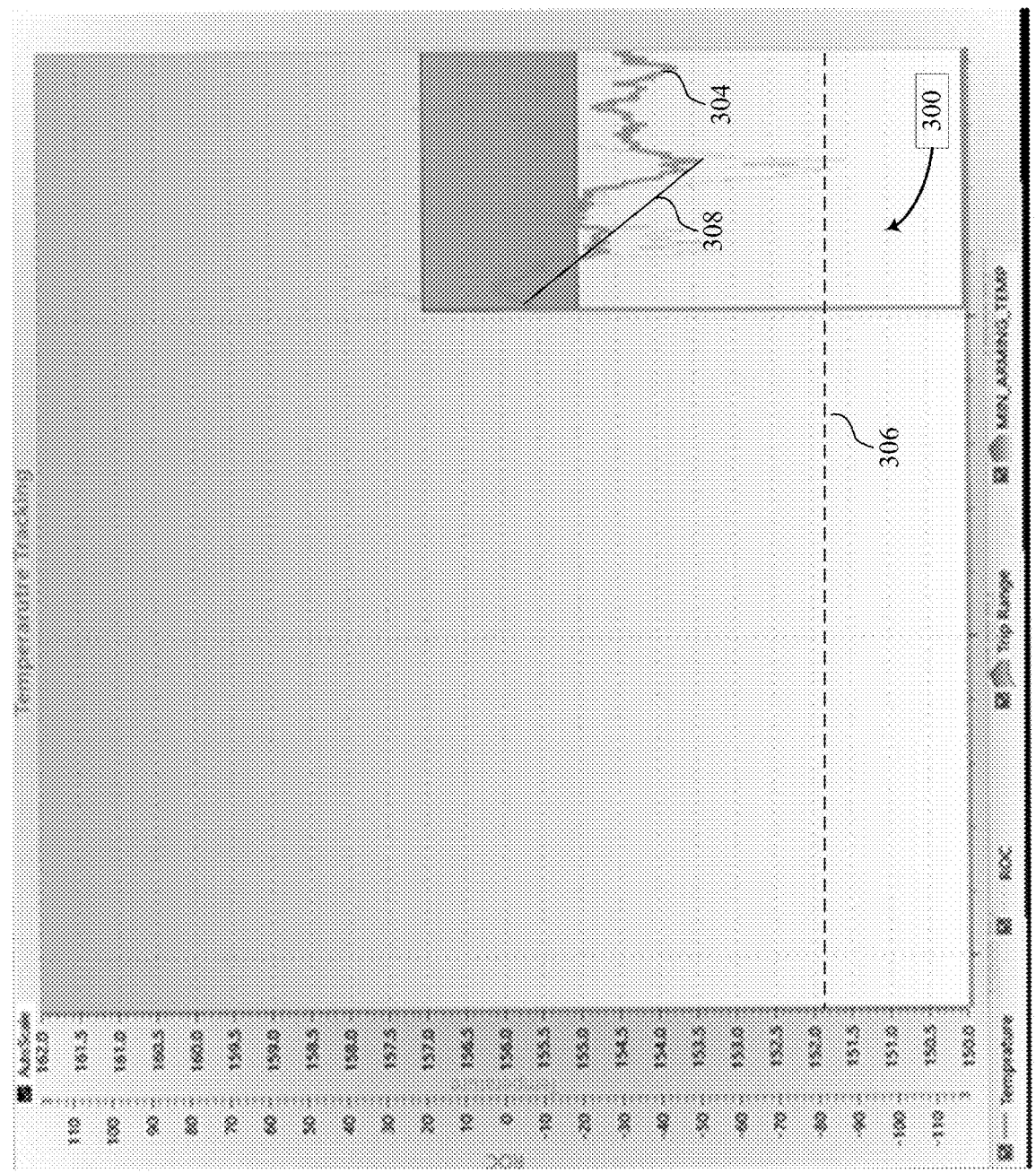
FIG. 3 illustrates an exemplary human machine interface display of the temperature tracking system output in accordance with the aspects of the present disclosure.
Figure 4:
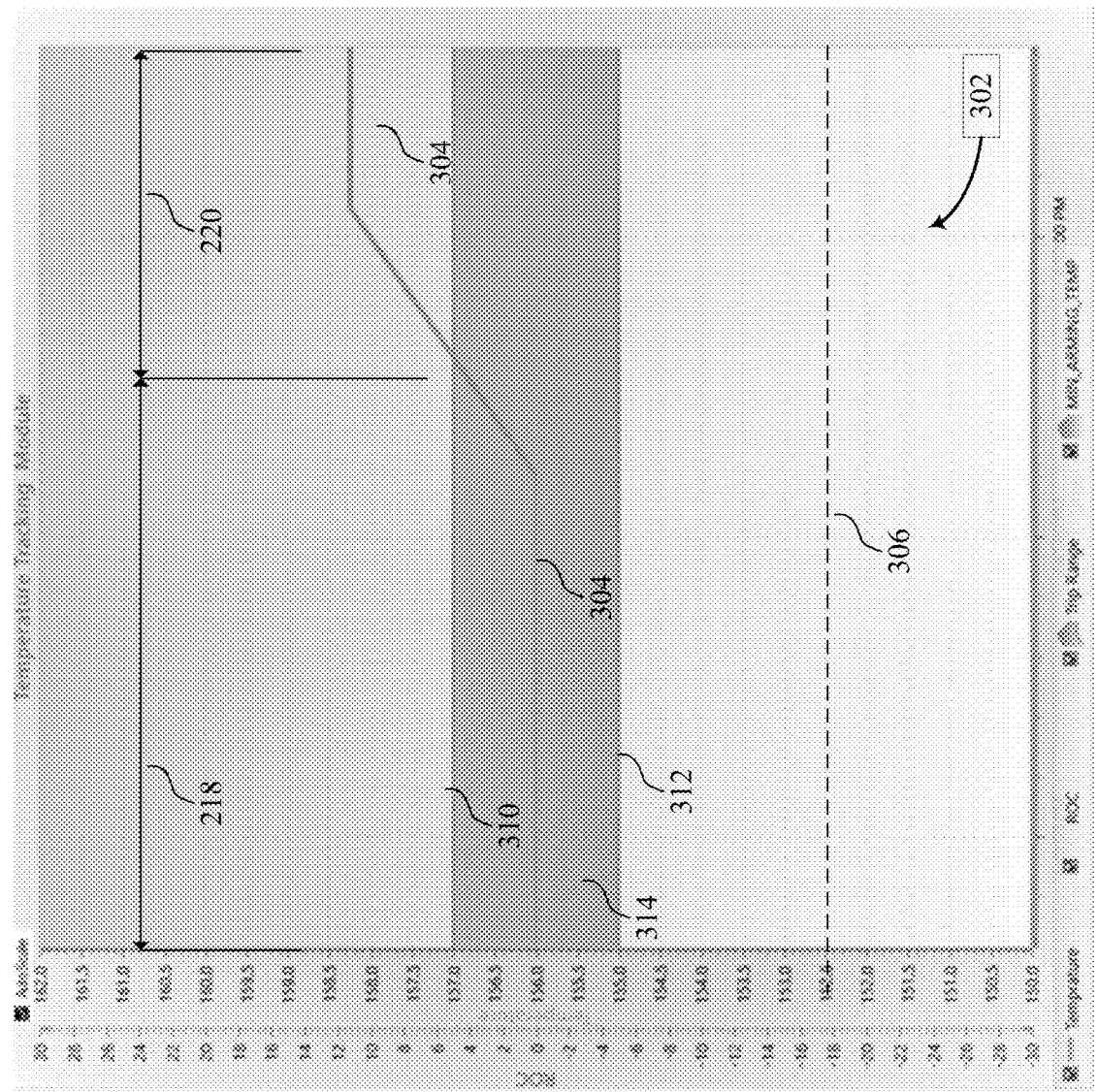
FIG. 4 illustrates an exemplary human machine interface display of the temperature tracking system output in accordance with the aspects of the present disclosure.

FIG. 2 illustrates an exemplary human machine interface display of an output of the control system 112 provided to illustrate the deficiencies of CROC. FIGS. 3 and 4 illustrate a human machine interface display of an output of the control system 112 for the temperature tracking system to illustrate how the temperature tracking system of the present disclosure cures the deficiencies of CROC. As shown in FIG. 2, the output of the control system 112 includes a first graph 200 and a second graph 202 illustrating the flowing pressure(s) 204 within the subsea system 106 and the ambient pressure 206. More specifically, the Y-axis of the graphs 200 and 202 is the pressure, both the flowing pressure 204 and the ambient pressure 206, and the X-axis of the graphs 200 and 202 is time. The control system 112 receives instantaneous and continuous values of the flowing pressure 204 from the flowing pressure transmitter 116. The control system 112 then plots the flowing pressure 204 and the ambient pressure 206 over time in graphs 200 and 202.

The first graph 200 plots the flowing pressure(s) 204 within the subsea system 106 and the ambient pressure 206 over a long period of time and the second graph 202 is a subset of the first graph 200 and plots the flowing pressure(s) 204 within the subsea system 106 and the ambient pressure 206 over a shorter period of time than the first graph 200. The first graph 200 plots the flowing pressure(s) 204 during several flow regimes and illustrates the shortcomings of the CROC system. Specifically, the first graph 200 illustrates the flowing pressure(s) 204 within the subsea system 106 in a first flow regime 216, a second flow regime 218, and a third flow regime 220.

As shown in the first graph 200, the flow pressure(s) 204 in the first flow regime 216 are stable (consistently near the same pressure without pressure spikes or changes) and are at a pressure that is well above the ambient pressure 206. In the first flow regime 216, the CROC system operated in a predictable and consistent manner without initiating any false alarms that the system was leaking.

The operators then lowered the pressure within the subsea system 106 and the production fluids within the subsea system 106 began to slug within the second flow regime 218. As shown in the first graph 200 and as partially illustrated in the second graph 202, the flow pressure(s) 204 in the second flow regime 218 are unstable (frequent pressure spikes or changes) and are at a pressure that is closer to the ambient pressure 206 than the flow pressure(s) 204 in the first flow regime 216. In the second flow regime 218, the CROC system operated in an unpredictable and inconsistent manner by frequently initiating false alarms that the system was leaking. More specifically, in the illustrated embodiment, the CROC system initiated a false alarm that the system was leaking approximately every 30 seconds. This became a distraction for the operators such that the operator turned off the CROC system. The reason the CROC system had a difficult time operating effectively in the second flow regime 218 is because the CROC system detects pressure changes to detect leaks. More specifically, the CROC system detects extreme changes in pressure that reach certain thresholds, and then it has conditional logic to either block out that signal or not, depending on operator interaction with the system. However, because the production fluid is in a slugging flow regime, the pressure changes frequently and the CROC system frequently detects leaks.

The third flow regime 220, shown on the first and second graphs 200 and 202, illustrates the flow pressure(s) 204 when the subsea system 106 is leaking. The flow pressure(s) 204 are typically very close to the ambient pressure 206 and remain close to the ambient pressure 206 while the subsea system 106 is leaking. More specifically, as described below, the flow pressure(s) 204 remain in an ambient zone 212 for an extend period of time and may be relatively stable around the ambient pressure 206. This stability may cause the CROC system to not initiate an alarm because the system is not rapidly changing as described above. Thus, the CROC system may not detect a leak in the illustrated operational circumstances.

In contrast, the temperature tracking system illustrated in FIGS. 3 and 4 is capable of detecting a leak when the CROC system illustrated in FIG. 2 may not be capable of detecting a leak and, as such, the temperature tracking system described herein may be used to supplement the CROC system to ensure the system 100 has an operational leak detection system at all times. Specifically, the output of the control system 112 includes a first graph 300 (shown in FIG. 3) and a second graph 302 (shown in FIG. 4) illustrating the operating temperature(s) 304 within the subsea system 106. More specifically, the Y-axis of the graphs 300 and 302 is the temperature (operating temperature 304) and the X-axis of the graphs 300 and 302 is time. The control system 112 receives instantaneous and continuous values of the operating temperature(s) 304 from the temperature transmitter 116. The control system 112 then plots the operating temperature(s) 304 over time in graphs 300 and 302.

The first graph 300 illustrates a graph of the operating temperature(s) 304 when the temperature tracking system is in the process of arming itself. In the illustrated embodiment, the temperature tracking system is a self-arming system that automatically arms itself when specific operating conditions are met in order to reduce false alarms. In alternative embodiments, the temperature tracking system may be manually armed by an operator rather than self-arming. Specifically, in the illustrated embodiment, the temperature tracking system continuously monitors the operating temperature(s) 304, ensuring the operating temperature(s) 304 is above a minimum threshold. The temperature tracking system then tracks a rate of temperature change of the operating temperature(s) 304 until the operating temperature(s) 304 stabilizes at its maximum level. Once the operating temperature(s) 304 remain stable for a predetermined period of time, the temperature tracking system arms itself by defining a temperature zone-a range defined by adding and subtracting a set number from the operating temperature(s) 304 to establish upper and lower temperature limits. If the temperature goes outside the temperature zone once armed, the module alerts the operator to a possible leak.

In the embodiment illustrated in FIG. 3, the temperature tracking system sets a minimum temperature threshold 306. In some embodiments, the minimum temperature threshold 306 is set automatically by the temperature tracking system. In alternative embodiments, the minimum temperature threshold 306 is set manually by an operator. Setting the minimum temperature threshold 306 is dependent on a number of factors that are highly dependent on the specific system that the control system 112 is monitoring including, but not limited to, the typical range and volatility of the operating temperature(s) 304 fluctuations, the slugging behavior of the production fluid, and the trend period. In some embodiment, the control system 112 may use artificial intelligence to predict, learn, tag, and/or otherwise model temperature trends. In some embodiments, the control system 112 may use an equation to calculate the minimum temperature threshold 306 based on other operating conditions of the system 100.

The operating temperature(s) 304 must exceed the minimum temperature threshold 306 for the temperature tracking system to automatically arm. Specifically, in the automatic arming temperature tracking system embodiment, the temperature tracking system will not arm itself until the operating temperature(s) 304 exceed the minimum temperature threshold 306. In alternative embodiments, the temperature tracking system may be manually armed by an operator if the operating temperature(s) 304 will not exceed the predetermined minimum temperature threshold 306 due to unusual operating conditions. Additionally, the temperature tracking system may detect or learn that the system 100 is operating at new conditions, may reset the minimum temperature threshold 306 for the new conditions, and may automatically arm itself based on the new minimum temperature threshold 306.

Once the operating temperature(s) 304 has exceeded the minimum temperature threshold 306, the temperature tracking system establishes that the operating temperature(s) 304 are relatively stable prior to automatically arming itself. More specifically, in the illustrated embodiment, the temperature tracking system calculates or otherwise determines a rate of change 308 of the operating temperature(s) 304. The rate of change 308 of the operating temperature(s) 304 may be an average rate of change over a predetermined amount of time or may be an instantaneous rate of change. In alternative embodiments, the rate of change 308 of the operating temperature(s) 304 may be any rate of change that enables the temperature tracking system to operate as described herein.

Additionally, once the operating temperature(s) 304 has exceeded the minimum temperature threshold 306, the temperature tracking system also determines if the operating temperature has reached a steady state operating temperature for a predetermined stability period by calculating or otherwise determining a stability rate of change threshold of the operating temperature(s) 304. In some embodiments, the stability rate of change threshold of the operating temperature(s) 304 is set automatically by the temperature tracking system. In alternative embodiments, the stability rate of change threshold of the operating temperature(s) 304 is set manually by an operator. Setting the stability rate of change threshold of the operating temperature(s) 304 is dependent on a number of factors that are highly dependent on the specific system that the control system 112 is monitoring including, but not limited to, the typical range and volatility of the operating temperature(s) 304 fluctuations, the slugging behavior of the production fluid, and the trend period. In some embodiment, the control system 112 may use artificial intelligence to predict, learn, tag, and/or otherwise model temperature trends for future modeling. In some embodiments, the control system 112 may use an equation to calculate the stability rate of change threshold of the operating temperature(s) 304 based on other operating conditions of the system 100.

The rate of change 308 of the operating temperature(s) 304 must be less than the stability rate of change threshold of the operating temperature(s) 304 for a predetermined stability period for the temperature tracking system to automatically arm. Specifically, in the automatic arming temperature tracking system embodiment, the temperature tracking system will not arm itself until the rate of change 308 of the operating temperature(s) 304 is below the stability rate of change threshold of the operating temperature(s) 304 for the predetermined stability period. In alternative embodiments, the temperature tracking system may be manually armed by an operator if the rate of change 308 of the operating temperature(s) 304 will not be below the predetermined stability rate of change threshold of the operating temperature(s) 304 due to unusual operating conditions. Additionally, the temperature tracking system may detect or learn that the system 100 is operating at new conditions, may reset the stability rate of change threshold of the operating temperature(s) 304 for the new conditions, and may automatically arm itself based on the new stability rate of change threshold of the operating temperature(s) 304.

In some embodiments, the predetermined stability period is set automatically by the temperature tracking system. In alternative embodiments, the predetermined stability period is set manually by an operator. Setting the predetermined stability period is dependent on a number of factors that are highly dependent on the specific system that the control system 112 is monitoring, including, but not limited to, the typical range and volatility of the operating temperature(s) 304 fluctuations, the slugging behavior of the production fluid, and the trend period. In some embodiment, the control system 112 may use artificial intelligence to predict, learn, tag, and/or otherwise model temperature trends. In some embodiments, the control system 112 may use an equation to calculate the predetermined stability period based on other operating conditions of the system 100.

The temperature tracking system then arms itself by setting an upper temperature limit 310 and a lower temperature limit 312. In some embodiments, the upper temperature limit 310 and the lower temperature limit 312 may be set automatically by the control system 112, and, in other embodiments, an operator may manually set the upper temperature limit 310 and the lower temperature limit 312. Setting the upper temperature limit 310 and the lower temperature limit 312 is dependent on a number of factors that are highly dependent on the specific system that the control system 112 is monitoring including, but not limited to, the typical range and volatility of the operating temperature(s) 304 fluctuations, the slugging behavior of the production fluid, and the trend period. In some embodiment, the control system 112 may use artificial intelligence to predict, learn, tag, and/or otherwise model temperature trends for future modeling. In some embodiments, the control system 112 may use an equation to calculate the upper temperature limit 310 and the lower temperature limit 312 based on other operating conditions of the system 100.

In some embodiments, the upper temperature limit 310 and the lower temperature limit 312 may be a predetermined temperature above and below the operating temperature(s) 304. For example, the upper temperature limit 310 may be 5° F., 10° F., 15° F., 20° F., or more above the operating temperature(s) 304, and the lower temperature limit 312 may be 5° F., 10° F., 15° F., 20° F., or more below the operating temperature(s) 304. In some embodiments, the upper temperature limit 310 and the lower temperature limit 312 may be set by a mathematical formula. In alternative embodiments, the upper temperature limit 310 and the lower temperature limit 312 may be set by any method that enables the systems and methods described herein to operate as described herein.

The control system 112 defines a temperature zone 314 between the upper temperature limit 310 and the lower temperature limit 312. The temperature zone 314 includes the temperatures below the upper temperature limit 310 and above the lower temperature limit 312. As described above, the upper temperature limit 310 and the lower temperature limit 312 may be a set amount of temperature above and below the operating temperature(s) 304, and, as such, the total temperature defined by the temperature zone 314 may be 5° F., 10° F., 15° F., 20° F., or more around the operating temperature(s) 304. In alternative embodiments, the temperature zone 314 may be defined using any method that enables the systems and methods described herein to operate as described herein.

The control system 112 then automatically and continuously tracks the operating temperature(s) 304. If the operating temperature(s) 304 is outside of the temperature zone 314, the control system 112 indicates to the operator that there may be a leak in the subsea system 106. In some embodiments, the control system 112 may initiate an alarm or an alert that there may be a leak in the subsea system 106. More specifically, if the operating temperature(s) 304 exceed the upper temperature limit 310 or is below the lower temperature limit 312, the control system 112 alerts the operator that there may be a leak in the subsea system 106 by initiating an alarm. Specifically, as shown in the second graph 302, the operating temperature(s) 304 are continuously in the temperature zone 314 in the second flow regime 218. However, in the third flow regime 220, when there is a leak in the system 100, the operating temperature(s) 304 are out of the temperature zone 314 and the control system 112 alerts the operator that there may be a leak in the subsea system 106 by initiating an alarm. More specifically, in the illustrated embodiment, the operating temperature(s) 304 exceed the upper temperature limit 310 and the pressure of the production fluid is higher than the ambient pressure such that flow rate of the production fluid increases (into the environment and to the oil and gas production system) and increases the operating temperature(s) 304 of the production fluids above the upper temperature limit 310. In an alternative embodiment, the pressure of the production fluid is lower than the ambient pressure and cooler water enters the production riser and/or the subsea pipeline, decreasing the operating temperature(s) 304 of the production fluid below the lower temperature limit 312. The control system 112 may be configured to determine a probability of a leak in the system 100 based on whether the operating temperature(s) 304 are outside the temperature zone 314 or based on at least one of the statics based on the ambient zone time described below.

The control systems 112 described herein are able to detect leaks in operating conditions that are unfavorable to the CROC system. Specifically, the control system 112 described herein operates in a different manner than the CROC system because it does not analyze pressure changes or spikes. Rather, the control systems 112 described herein analyze if the operating temperature(s) 204 remain in the temperature zone 314 after the system 100 has met the threshold conditions for the control system 112 to arm itself. This is a fundamentally different analysis than the CROC system and the control systems 112 described herein may be used to supplement the CROC system or may be used instead of the CROC system.

Additionally, the control systems 112 described herein may be used in conjunction with other leak detection methods to provide a robust leak detection system with several detection methods that provide a check on each of the other methods. For example, the control systems 112 described herein may be used with the CROC system, a mass-in, mass-out system, an ambient pressure zone-based leak detection system, and/or any other system.

Furthermore, the control systems 112 described herein provide continuous, automatic, and instantaneous tracking and analysis of the operating temperature(s) 304 in real time to determine if the subsea system 106 may be leaking. Specifically, operators of production systems 100 have to attend to and monitor many operating parameters of the systems and it is completely impractical for an operator to continuously track and monitor the operating temperature(s) 304 of the system and determine if the operating temperature(s) 204 remain in the predetermined temperature zone 314 on a continuous basis. Accordingly, the control systems 112 described herein provide continuous and automatic leak detection so that the operators can attend to the operations of the system.

The embodiments illustrated herein include a single control system 112. However, as illustrated in FIG. 1, the control system 112 may be connected to a plurality of temperature transmitters 114 and, as such, may include a plurality of temperature tracking systems simultaneously monitoring the entire system 100. When a system 100 with a plurality of temperature tracking systems leaks, the operating temperature(s) 304 of each temperature tracking system will enter the temperature zone 314 sequentially depending on the proximity of the temperature tracking system to the leak such that the operating temperature(s) 304 of each temperature tracking system will enter the temperature zone 314 one at a time. Thus, when the operating temperature(s) 304 of a first temperature tracking system enters the temperature zone 314 followed by the operating temperature(s) 304 of a second temperature tracking system, the operator is able to quickly ascertain that the system 106 may be leaking and may be able to locate the leak based on the order in which the operating temperature(s) 304 of each temperature tracking system entered the temperature zone 314.

Additionally, the control system 112 may track various statistics related to the operating temperature(s) 304 and the control system 112 may alert the operators to a leak based on analysis of tracked statistics. For example, the control system 112 may tracks the amount of time that the operating temperature(s) 304 is within the temperature zone 314 (a temperature zone time). If the operating temperature(s) 304 is within the temperature zone 314 for an amount of time that is less than or equal to a predetermined amount of time, the control system 112 alerts the operator that there may be a leak in the subsea system 106. The predetermined amount of time is dependent on a number of factors that are highly dependent on the specific system that the control system 112 is monitoring including, but not limited to, the typical range and volatility of the operating temperature(s) 304 fluctuations, the slugging behavior of the production fluid, and the trend period. In some embodiments, the predetermined amount of time may be 30 minutes, an hour, 2 hours, and/or more than 2 hours.

The control system 112 may track the total amount of time that the operating temperature(s) 304 is out of the temperature zone 314. If the operating temperature(s) 304 is out of the temperature zone 314 for a total amount of time that is greater than or equal to a predetermined total amount of time, the control system 112 alerts the operator that there may be a leak in the subsea system 106. The total predetermined amount of time is dependent on a number of factors that are highly dependent on the specific system that the control system 112 is monitoring including, but not limited to, the typical range and volatility of the operating temperature(s) 304 fluctuations, the slugging behavior of the production fluid, and the trend period. The total amount of time and the predetermined total amount of time may be expressed as a percentage of total time.

The control system 112 may be further configured to calculate an average amount of time in the temperature zone 314 that calculates the average length of time that the operating temperature(s) 304 stays within the temperature zone 314, assessing the stability of the process over time. The control system 112 may be further configured to calculate an average amount of time out of the temperature zone 314 that calculates an average measure of the time intervals when the operating temperature(s) 304 is outside the temperature zone 314 over a selectable timeframe. The control system 112 may also be configured to count the number of times the operating temperature(s) 304 transitions between in-temperature zone and out-of-temperature zone states within an adjustable period to provide the operator with an understanding of the process's variability and the effectiveness of control measures. Finally, the control system 112 may be configured to determine whether to issue an alarm or warning to the operator based on the various statics described herein and an analysis of the frequency and duration of out-of-ambient zone occurrences and the number of transitions, ensuring timely alerts for any process anomalies.

In alternative embodiments, the control system 112 may calculate a running average of the operating temperature(s) 304 over a specified period of time. Furthermore, in some embodiments, the control system 112 may be configured to analyze the peaks and valleys of the operating temperature(s) 304 to determine if the operating temperature(s) 304 is peaking or dipping to approximately the same temperature all the time, indicating a leak. If the temperature peaks always stop at a certain point, it would indicate an external leak that occurs when temperature rises. The opposite would be true for valleys stopping, indicating a leak into the production riser 104 at this point. A leak may also cause a dampening of the peaks and valleys in both directions and ultimately produce a trend of up and down fluctuations that float.

Typically, CROC detects leaks by monitoring pressure and detecting rapid changes in pressure that would likely occur in a leak scenario. Monitoring thresholds and settings are adjusted as required when flowing conditions change, but there are limits to reliable monitoring with CROC. The CROC algorithm is unsuitable for fields that flow near ambient operating conditions due to the potential for false alarms in the narrow pressure range available to identify potential leaks. CROC leak detection under these conditions is especially difficult if slug flow is occurring because rapid pressure changes due to slug flow are hard to distinguish from the pressure changes that occur because of a leak because both scenarios can result in a relatively rapid change in pressure towards ambient conditions. Additionally, for systems that operate very near ambient pressure, the change in pressure if a leak were to occur would not be as dramatic and, therefore, very difficult to distinguish from normal operations.

The systems and methods described herein reduce nuisance alarms because the systems and methods described herein do not rely on detecting rapid pressure changes to detect leaks. Rather, the systems and methods described herein are configured to detect leaks during slug flow when rapid pressure changes are frequent and may cause false alarms. Specifically, if a leak were to occur in the production riser 104, the production fluid would be leaking out of the production riser 104 and the temperature of the production fluid in the production riser 104 typically increases or decreases. That is, during a leak, the typical temperature signatures of the production fluid would significantly change, causing the temperature to increase or decrease in an unexpected manner. The systems and methods described herein detect when the operating temperature(s) 304 is not between the upper and lower temperature limits and alerts the operator to a possible leak without relying on pressure spikes. As such, the systems and methods described herein reduce the scenarios where existing leak detection systems are less likely to detect a leak.

Figure 5:
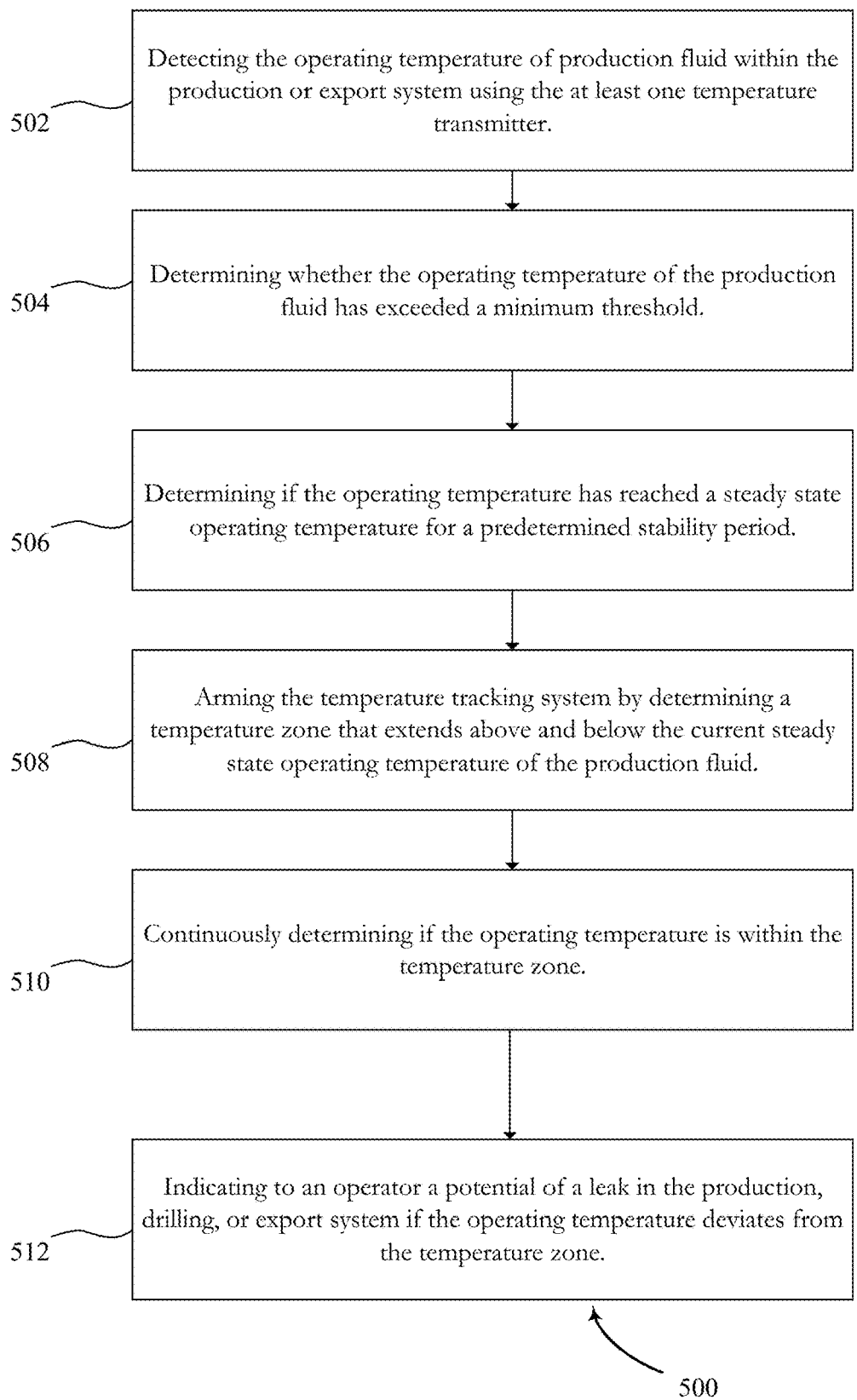
FIG. 5 illustrates a flow diagram of a method of detecting a leak in a subsea system in accordance with aspects of the present disclosure.

FIG. 5 illustrates a flow diagram of a method 500 of detecting a leak in a production, drilling, or export system including a control system including at least one temperature transmitter configured to detect an operating temperature of the production, drilling, or export system. The method 500 includes detecting 502 the operating temperature of production fluid within the production, drilling, or export system using the at least one temperature transmitter. The method 500 also includes activating 504 a temperature tracking system if the operating temperature of the production fluid exceeds a minimum temperature threshold. The method 500 further includes determining 506 if the operating temperature has reached a steady state operating temperature for a predetermined stability period. The method 500 also includes arming 508 the temperature tracking system by determining a temperature zone that extends above and below the steady state operating temperature of the production fluid. The method 500 further includes continuously determining 510 if the operating temperature is within the temperature zone. The method 500 also includes indicating 512 to an operator a potential of a leak in the production, drilling, or export system if the operating temperature deviates from the temperature zone.

It should be noted that the methods described herein describe possible implementations, and that the operations and the steps may be rearranged or otherwise modified and that other implementations are possible. Furthermore, aspects from two or more of the methods may be combined.

If wireless communications are used, the techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 805.11 (Wi-Fi), IEEE 805.16 (WiMAX), IEEE 805.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein may include one or more carriers.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical venues. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A method of detecting a leak in a production, drilling, or export system comprising a control system comprising at least one temperature transmitter configured to detect an operating temperature of the production, drilling, or export system, the method comprising:
   detecting the operating temperature of a production fluid within the production, drilling, or export system using the at least one temperature transmitter;
   activating a temperature tracking system if the operating temperature of the production fluid exceeds a minimum temperature threshold;
   determining if the operating temperature has reached a steady state operating temperature for a predetermined stability period using a second differential of the operating temperature of the production fluid;
   arming the temperature tracking system by determining a temperature zone that extends above and below the steady state operating temperature of the production fluid;
   continuously determining if the operating temperature is within the temperature zone; and
   indicating to an operator a potential of a leak in the production, drilling, or export system if the operating temperature deviates from the temperature zone.

2. The method of claim 1, wherein arming the temperature tracking system by determining a temperature zone that extends above and below the steady state operating temperature of the production fluid comprises arming the temperature tracking system by determining a lower limit temperature below the steady state operating temperature of the production fluid lower limit temperature.

3. The method of claim 2, wherein arming the temperature tracking system by determining a temperature zone that extends above and below the steady state operating temperature of the production fluid comprises arming the temperature tracking system by determining an upper limit temperature above the steady state operating temperature of the production fluid lower limit temperature.

4. The method of claim 3, wherein indicating to an operator a potential of a leak in the production, drilling, or export system if the operating temperature deviates from the temperature zone comprises indicating to an operator a potential of a leak in the production, drilling, or export system if the operating temperature exceeds the upper temperature limit or is less than the lower temperature limit.

5. The method of claim 4, further comprising initiating an alarm if the operating temperature exceeds the upper temperature limit or is less than the lower temperature limit.

6. The method of claim 1, wherein arming the temperature tracking system comprises manually arming the temperature tracking system by the operator.

7. The method of claim 1, wherein arming the temperature tracking system comprises automatically arming the temperature tracking system.

8. The method of claim 1, wherein determining if the operating temperature has reached a steady state operating temperature for a predetermined stability period comprises determining a rate of temperature change of the operating temperature.

9. The method of claim 8, further comprising determining whether the rate of temperature change of the operating temperature is lower than a stability rate of change threshold of the operating temperature.

10. The method of claim 9, further comprising activating the temperature tracking system if the rate of temperature change of the operating temperature is lower than the stability rate of change threshold of the operating temperature.

11. A method of detecting a leak in a production, drilling, or export system comprising a control system comprising at least one temperature transmitter configured to detect an operating temperature of the production, drilling, or export system, the method comprising:
   detecting the operating temperature of production fluid within the production, drilling, or export system using the at least one temperature transmitter;
   activating a temperature tracking system if the operating temperature of the production fluid exceeds a minimum temperature threshold;
   determining if the operating temperature has reached a steady state operating temperature for a predetermined stability period using a second differential of the operating temperature of the production fluid;
   automatically arming the temperature tracking system by determining a lower limit temperature below the steady state operating temperature of the production fluid lower limit temperature and an upper limit temperature above the steady state operating temperature of the production fluid lower limit temperature to define a temperature zone;
   continuously determining if the operating temperature is within the temperature zone; and
   indicating to an operator a potential of a leak in the production, drilling, or export system if the operating temperature exceeds the upper temperature limit or is less than the lower temperature limit.

12. The method of claim 11, further comprising initiating an alarm if the operating temperature exceeds the upper temperature limit or is less than the lower temperature limit.

13. The method of claim 11, wherein determining if the operating temperature has reached a steady state operating temperature for a predetermined stability period comprises determining a rate of temperature change of the operating temperature.

14. The method of claim 13, further comprising determining whether the rate of temperature change of the operating temperature is lower than a stability rate of change threshold of the operating temperature.

15. The method of claim 14, further comprising activating the temperature tracking system if the rate of temperature change of the operating temperature is lower than the stability rate of change threshold of the operating temperature.

16. A method of detecting a leak in a production, drilling, or export system comprising a control system comprising at least one temperature transmitter configured to detect an operating temperature of the production, drilling, or export system, the method comprising:
   detecting the operating temperature of production fluid within the production, drilling, or export system using the at least one temperature transmitter;

activating a temperature tracking system if the operating temperature of the production fluid exceeds a minimum temperature threshold;

determining if the operating temperature has reached a steady state operating temperature for a predetermined stability period using a second differential of the operating temperature of the production fluid;

automatically arming the temperature tracking system by determining a lower limit temperature below the steady state operating temperature of the production fluid lower limit temperature and an upper limit temperature above the steady state operating temperature of the production fluid lower limit temperature to define a temperature zone;

continuously determining if the operating temperature is within the temperature zone; and initiating an alarm if the operating temperature exceeds the upper temperature limit or is less than the lower temperature limit.

17. The method of claim 16, further comprising determining a probability of a leaking in the production, drilling, or export system based on whether the operating temperature exceeds the upper temperature limit or is less than the lower temperature limit.

18. The method of claim 16, further comprising alerting an operator if the operating temperature exceeds the upper temperature limit or is less than the lower temperature limit.

19. The method of claim 16, wherein determining if the operating temperature has reached a steady state operating temperature for a predetermined stability period comprises determining a rate of temperature change of the operating temperature.

20. The method of claim 19, further comprising determining whether the rate of temperature change of the operating temperature is lower than a stability rate of change threshold of the operating temperature.

* * * * *